United States Patent [19]

Hamlyn

[11] 4,377,366
[45] Mar. 22, 1983

[54] SPARE WHEEL CARRIER FOR A MOTOR VEHICLE

[75] Inventor: Nigel C. Hamlyn, Plymouth, England

[73] Assignee: Ford Motor Company, Dearborn, Mich.

[21] Appl. No.: 226,957

[22] Filed: Jan. 21, 1981

[51] Int. Cl.³ .............................................. B62D 43/00
[52] U.S. Cl. .................................... 414/466; 74/128; 74/142; 224/42.23; 254/376
[58] Field of Search ................. 74/128, 129, 142, 143; 414/463, 466; 224/42.12, 42.23, 42.24; 254/47, 48, 357, 358, 376; 242/99

[56] References Cited

U.S. PATENT DOCUMENTS

| | | | |
|---|---|---|---|
| 1,983,767 | 12/1934 | Mueller | 414/463 |
| 3,163,400 | 12/1964 | Skerry | 254/376 |
| 3,724,816 | 3/1973 | Cain et al. | 254/376 |
| 3,952,894 | 3/1976 | Mendez | 414/463 |
| 4,028,951 | 6/1977 | Matsuzawa | 74/128 |

FOREIGN PATENT DOCUMENTS

| | | | |
|---|---|---|---|
| 845521 | 5/1939 | France | 254/376 |
| 55-139549 | 10/1980 | Japan | 74/129 |

*Primary Examiner*—Robert J. Spar
*Assistant Examiner*—Janice Krizek
*Attorney, Agent, or Firm*—Daniel M. Stock; Clifford L. Sadler

[57] ABSTRACT

A spare wheel carrier for a motor vehicle, especially a truck, comprises a rotatable spindle 1 carrying a cable 6 the free end of which passes through the center of the wheel 8 and is attached to a cross-bar 7 bolted to the wheel 8 and a supporting beam 9 which is in turn normally bolted to the underside of the vehicle. The wheel is lowered with the beam 9 and cross-bar 7 by unwinding the cable 6 from the spindle 1. Unwinding is controlled by an escapement comprising a ratchet wheel 12 and an anchor plate 19 which is reciprocated by a jack handle inserted in an aperture 23 in the anchor plate.

1 Claim, 3 Drawing Figures

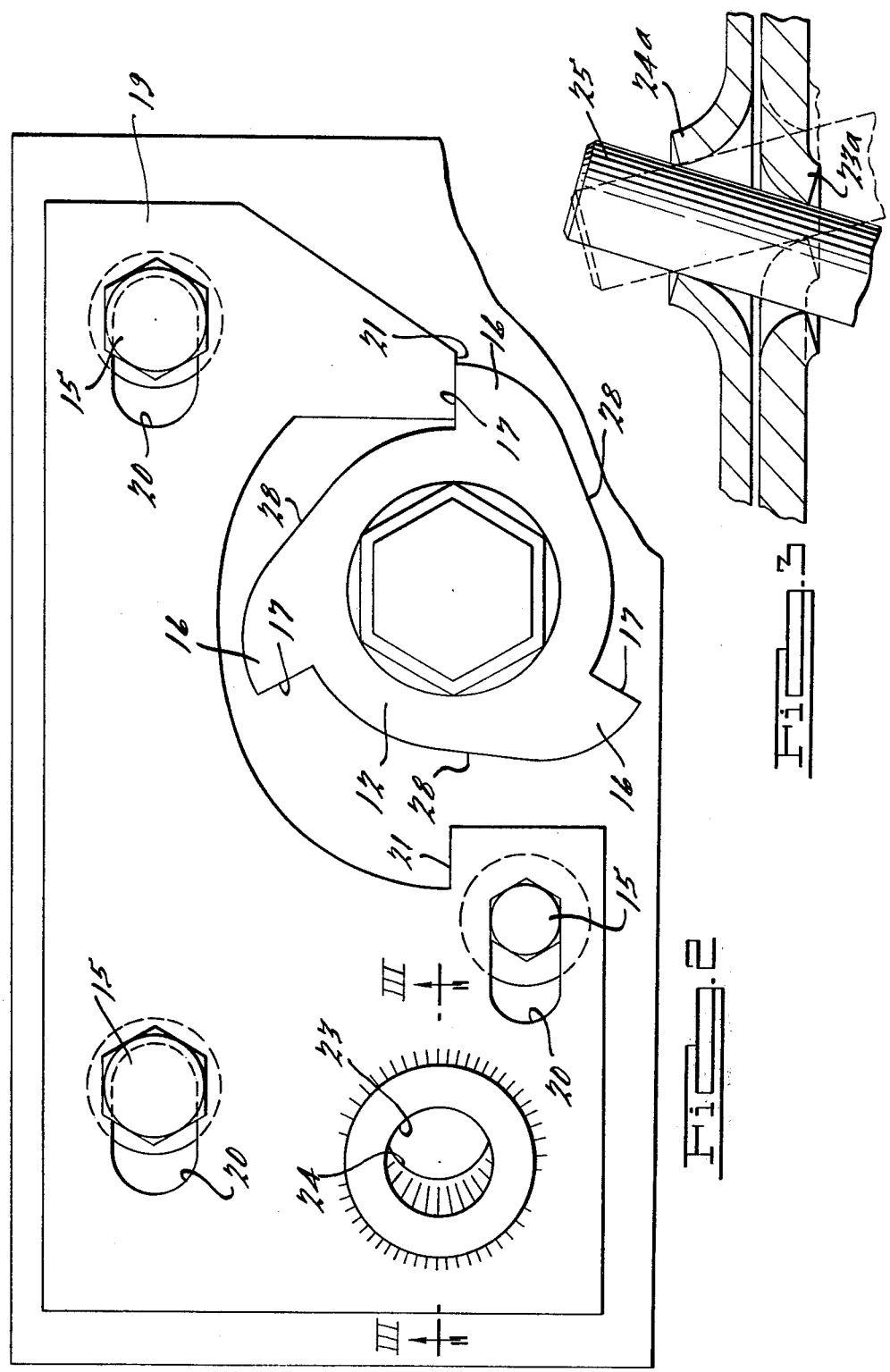

SPARE WHEEL CARRIER FOR A MOTOR VEHICLE

BACKGROUND OF THE INVENTION

This invention relates to spare wheel carriers for motor vehicles, especially trucks.

Conventional spare wheel carriers comprise a spindle mounted for rotation on the frame of the vehicle, a cable wound around the spindle and releasably connected at its free end to the spare wheel, whereby rotation of the spindle in one direction lowers the wheel from the vehicle, and a releasable ratchet for normally preventing rotation of the spindle in a direction in which the cable is unwound. In one known arrangement, the ratchet comprises a ratchet wheel on the spindle and a pawl which is spring biased into engagement with the ratchet wheel to allow the cable to be wound on to, but not from the spindle. In order to unwind the cable and to lower the wheel, the pawl is disengaged from the ratchet wheel, for example by using a tommy bar, whereupon the wheel falls to the ground under its own weight.

Since the wheel of a truck is relatively heavy, uncontrolled movement of the wheel during lowering can be dangerous.

SUMMARY OF THE INVENTION

According to the present invention there is provided a spare wheel carrier for a motor vehicle comprising a spindle adapted to be rotatably mounted on a vehicle frame, a cable wound around the spindle and adapted at its free end to be secured to a vehicle wheel, and a releasable ratchet for normally preventing the spindle from rotating in a direction in which the cable would unwind therefrom, characterized in that the releasable ratchet comprises an escapement movable between first and second engaged positions thereby to permit rotation of the spindle in the said direction in incremental steps.

By using an escapement to control the movement of the spindle, the wheel may be safely lowered from the vehicle in a controlled manner.

Preferably the escapement comprises a ratchet wheel rotatable with the spindle and an anchor having two stop surfaces, each of which engages a tooth of the ratchet wheel when the other is disengaged therefrom, the anchor being reciprocable relative to the ratchet wheel between two positions in which respective ones of the stop surfaces engage the ratchet wheel. By mounting the anchor for reciprocating movement rather than pivotal movement, the space occupied by the escapement can be reduced in relation to the travel of the anchor.

Conveniently, the anchor defines an orifice which overlies a similar orifice in a backing plate whereby the anchor may be moved relative to the backing plate by means of a lever engaged in the orifices.

DESCRIPTION OF THE DRAWINGS

A preferred embodiment of the invention will now be described, by way of example only, with reference to the drawings, in which:

FIG. 2 is an elevation, on an enlarged scale of part of the carrier taken in the direction of the arrow A of FIG. 1; and FIG. 3 is a transverse cross section of the carrier taken along line III—III of FIG. 2.

DETAILED DESCRIPTION OF THE INVENTION

Figure 1:
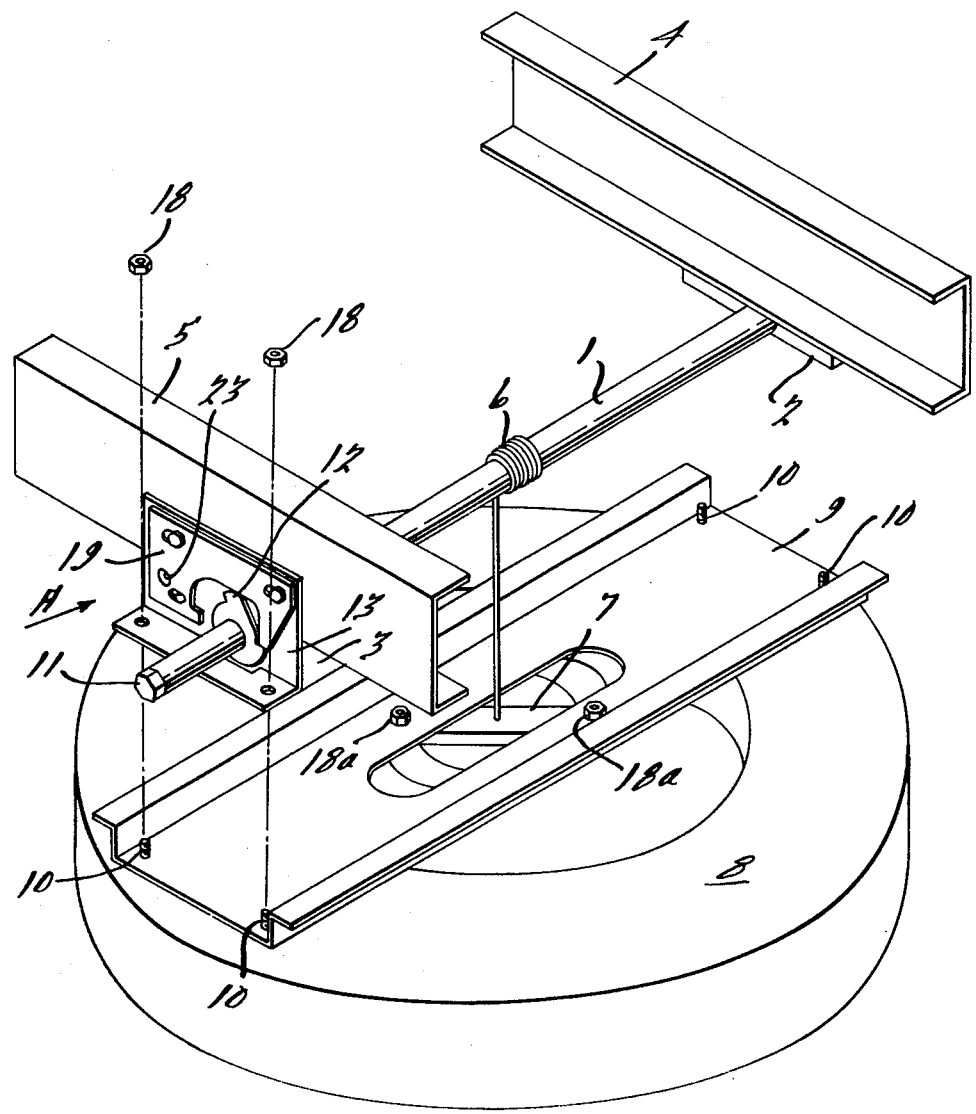
FIG. 1 is a perspective view of a spare wheel carrier in accordance with the invention.

Referring to the drawings, a spare wheel carrier for a motor vehicle comprises a spindle 1 rotatably mounted in substantially identical bearing brackets 2, 3 each secured to the underside of the chassis members 4, 5 of the vehicle as is shown with respect to bracket 2 in FIG. 1. A cable 6 is fixed to the mid-point of the spindle 1 and at its free end carries a cross-bar 7 which includes two upstanding threaded mounting studs which are positioned to project upwardly through two diametrically-opposed wheel-mounting holes in a wheel 8. The cross-bar 7 and the cable 6 pass through an aperture in the center of a wheel support beam 9 which carries four upstanding threaded studs 10 carrying nuts 18 by means of which the beam 9 is bolted to the bearing brackets 2, 3. The cross-bar 7 is itself bolted to the beam 9 by means of nuts 18a on the mounting studs, which pass through bolt holes in the beam 9.

The spindle 1 has a hexagonal head 11 at one end for engagement by a socketed winding handle (not shown).

A ratchet wheel 12 is secured to the spindle 1 adjacent a backing plate 13 which, as best seen in FIG. 2, is bolted to one of the chassis members, member 5 illustrated, of the vehicle by three bolts 15. A similar backing plate (not shown) is, in one embodiment, similarly secured to chassis member 4 for effecting attachment of the beam 9.

The ratchet wheel 12 includes three teeth 16, each of which defines a radial abutment surface 17. The radius of the ratchet wheel increases progressively in an anti-clockwise direction from the inner end of each abutment surface to the outer end of the next abutment surfaces, thereby forming cam surfaces 28 between adjacent teeth.

An anchor plate 19 is mounted on the three bolts 15, which pass through slots 20 in the plate 19 so that the anchor plate 19 can be reciprocated between two terminal positions relative to the backing plate 13 by washers mounted on the bolts 15 to prevent the plate 19 from siezing on to the backing plate 13 as a result of corrosion.

The anchor plate 19 includes two stop surfaces 21 each of which lies along a radius of the ratchet wheel 12. The stop surfaces 21 are so spaced that in each terminal position of the anchor plate, one stop surface 21 is in engagement with an abutment surface 17 of one of the teeth 16, whilst the other is disengaged from the teeth 16.

An aperture 23 in the anchor plate 19 overlies a similarly-sized aperture 24 in the backing plate 13 when the anchor-plate is midway between the two terminal positions. This enables the anchor plate to be moved between the two terminal positions by inserting a lever 25, such as a wheel brace or jack handle into the two apertures 23, 24, as seen in FIG. 3, and moving the lever from side to side, as indicated by the full-lines and broken lines in FIG. 3. The aperture 23, 24 are of a size sufficient to allow the lever 25 to be inserted when the plate 19 is in either terminal position. The edges of the apertures 23 and 24 are provided with turned-over flanges 23a, 24a to assist this operation.

In order to remove the wheel from the carrier, the four nuts 18 securing the wheel support beam 9 are removed, releasing the beam 9, wheel 8 and cross-bar 7 from the chassis members 4, 5. The lever 25 is then inserted into the apertures 24, 23 and operated so as to reciprocate the plate 19 between its end positions. At each reciprocation, one of the stop surfaces 21 is disengaged from a tooth 16 on the ratchet wheel 12, which permits the spindle to rotate until the next tooth 16 comes into engagement with the other stop surface, thereby partly unwinding the cable 6. In this way the wheel 8, beam 9 and cross-bar 7 are gradually lowered to the ground. The nuts 18a are then removed, releasing the cross-bar 7 from the beam 9 and the cross-bar 7 is then manipulated through the centre of the wheel 8 and the beam 9, allowing the wheel to be removed.

In order to replace the wheel in the carrier, the beam 9 is laid across the wheel 8; the cross bar is passed through the beam 9 and the centre of the wheel 8 and the three components are secured together by the nuts 18a. The assembly is then raised by winding the spindle using a winding handle (not shown) on the hexagonal head of the spindle. During this movement, the anchor plate is reciprocated as a result of the engagement of the cam surfaces 28 on the ratchet wheel 12 with the corresponding engagement surfaces adjacent the stop surfaces 21 on the anchor plate 19.

When the wheel has been raised, the beam 9 is secured to the chassis members 4, 5 by means of the nuts 18 on the studs 10 which are received through apertures formed through the backing plates 13.

The embodiment of the invention described above therefore provides a wheel carrier of simple and robust construction which is easy to operate and which ensures that the spare wheel 8 is lowered to the ground in a safe and controlled manner.

I claim:

1. A spare wheel carrier for a motor vehicle comprising a spindle adapted to be rotatably mounted on a vehicle frame, a cable wound around the spindle and adapted at its free end to be secured to a vehicle wheel, and a releasable ratchet for normally preventing the spindle from rotating in a direction in which the cable would unwind therefrom, characterized in that the releasable ratchet comprises an escapement movable between first and second engaged positions to permit rotation of the spindle in the said direction in incremental steps, the escapement including a ratchet rotatable with the spindle and an anchor having two stop surfaces, each of which engages a tooth of the ratchet wheel when the other is disengaged therefrom, the anchor defining an orifice which overlies an orifice defined in a backing plate relative to which the anchor is movable, whereby movement of the anchor may be effected by means of a lever engaged in the two orifices.

* * * * *